March 12, 1929.   J. T. SINER   1,704,769
TRUCK
Filed March 1, 1927
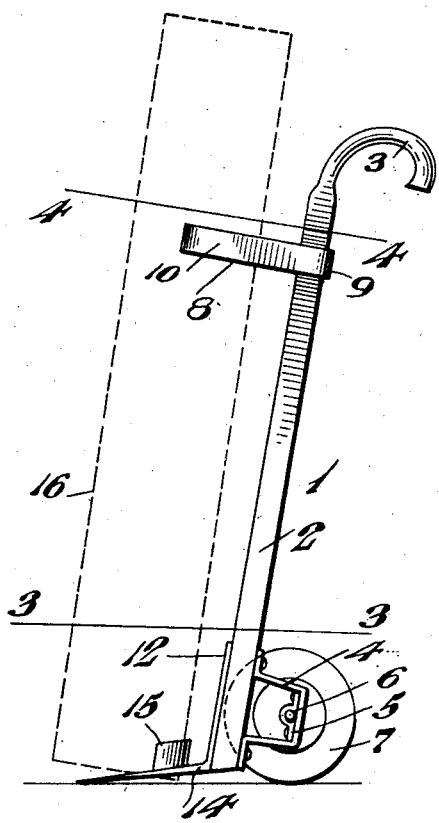
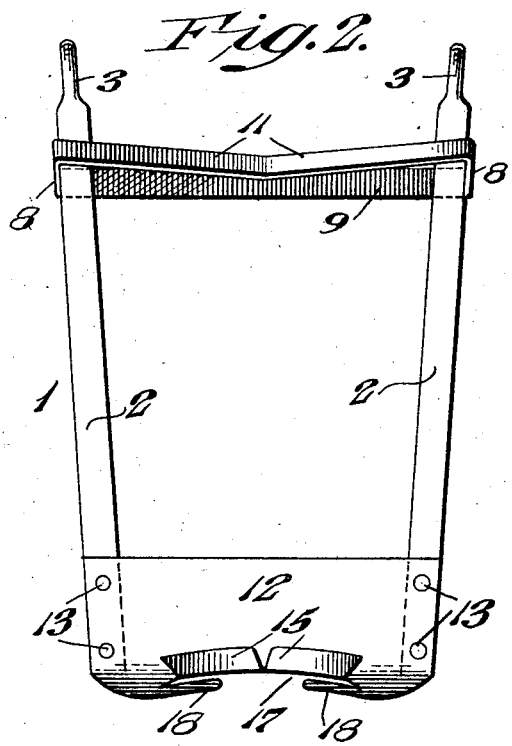
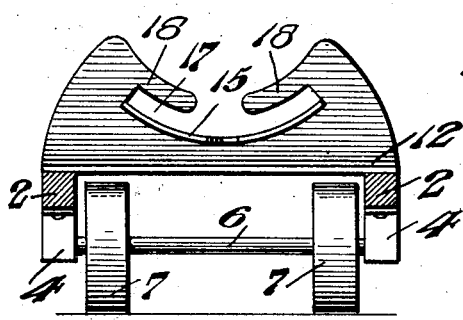
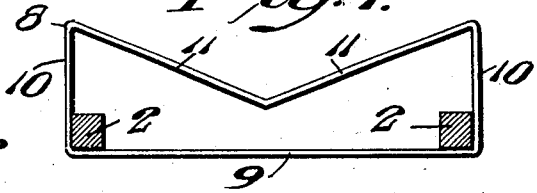
Inventor
John T. Siner
By Herbert S. Fairbanks
Attorney Patented Mar. 12, 1929.

1,704,769

UNITED STATES PATENT OFFICE.

JOHN T. SINER, OF LANCASTER, PENNSYLVANIA.

TRUCK.

Application filed March 1, 1927. Serial No. 171,740.

The object of this invention is to devise a novel construction of a truck which although not limited to such use is especially adapted for the handling of rolls of linoleum and which overcomes the likelihood of the edges being broken when the linoleum or other roll is being trucked from one place to another.

In trucks as heretofore manufactured, injury to the rolls has occurred from the cutting through of the cloth cover of the rolls and this is overcome in my present construction of truck plate which fits the roll and does not break the edges of the roll.

With the above and other objects in view as will hereinafter more clearly appear my invention comprehends a novel construction of a truck.

It further comprehends a novel truck having a novel construction of a roll cradle.

It further comprehends a novel construction of a truck having at its forward end a novel construction of a truck plate.

Other novel features of construction and advantage will more clearly hereinafter appear in the detailed description and the appended claim.

Figure 1 is a side elevation of a truck embodying my invention.

Figure 2 is a top plan view of the truck.

Figure 3 is a section on line 3—3 of Figure 1.

Figure 4 is a section on line 4—4 of Figure 1.

Similar numerals of reference indicate corresponding parts.

Referring to the drawings:—

1 designates a truck embodying my invention. The truck is provided with the side rails or bars 2 which at their inner ends are curved downwardly and forwardly to form grasping handles 3. The side bars 2 have secured to them in any desired manner the brackets 4 which carry journals 5 to receive the shaft 6 on which the wheels 7 are mounted.

The side bars 2 are connected near their inner or rear ends by a cradle 8 in the form of a strap or strip having a straight stretch 9 extending beneath the side bars 2 and secured thereto in any desired manner, and provided with the upwardly extending sides 10 which merge into the downwardly converging top members 11. The cradle is preferably made from a single strip of material having its free ends connected together by welding, riveting or any other desired manner. This construction of cradle gives a perfect fit and a solid seat for the roll.

12 designates a shoe or plate which is secured to the side bars 2 by means of fastening devices 13 of any desired type. The forward end of the plate 12 is bent upwardly at an angle to form a front flange 14 which has a portion of the material deflected laterally therefrom to form a curved seat 15 to receive and support the linoleum or other roll 16 and also to provide an opening 17 through which the lower forward edge of the roll can extend as will be clear from Figure 1. The inwardly extending curved arms 18 contribute, with the portions of the flange from which they extend, to form a fixed stop for the roll. The truck plate can be economically manufactured from plate steel by a pressing or stamping operation.

My present invention has been found in practice to be a marked advance in the art and although it is especially adapted for use in the trucking of rolls, barrels and other articles having the general contour of a roll, it will be apparent that it is adapted for all kinds of trucking.

It will be apparent from the foregoing that I have devised a novel construction of a truck which embodies the features of advantage set forth in the foregoing description and the appended claim, and while I have in the present instance shown and described a preferred embodiment of it, it will be apparent the invention is susceptible of modifications in various particulars without departing from the spirit and scope of the invention.

Having thus described my invention what I claim as new and desire to secure by Letters Patent, is:—

A nose plate for a truck, comprising a plate having a substantially flat base portion adapted to be connected with the side rails of the truck and having at its forward end an upwardly extending flange having a portion of its material laterally deflected to form a curved seat to receive and support the material being trucked and provide an opening through which the lower forward edge of the article can extend, and provided above said curved seat with inwardly extending curved arms which contribute to form a fixed stop for the article.

JOHN T. SINER.